Jan. 12, 1937. M. WINTER ET AL 2,067,221
CARBURETOR
Filed June 28, 1934 3 Sheets-Sheet 1
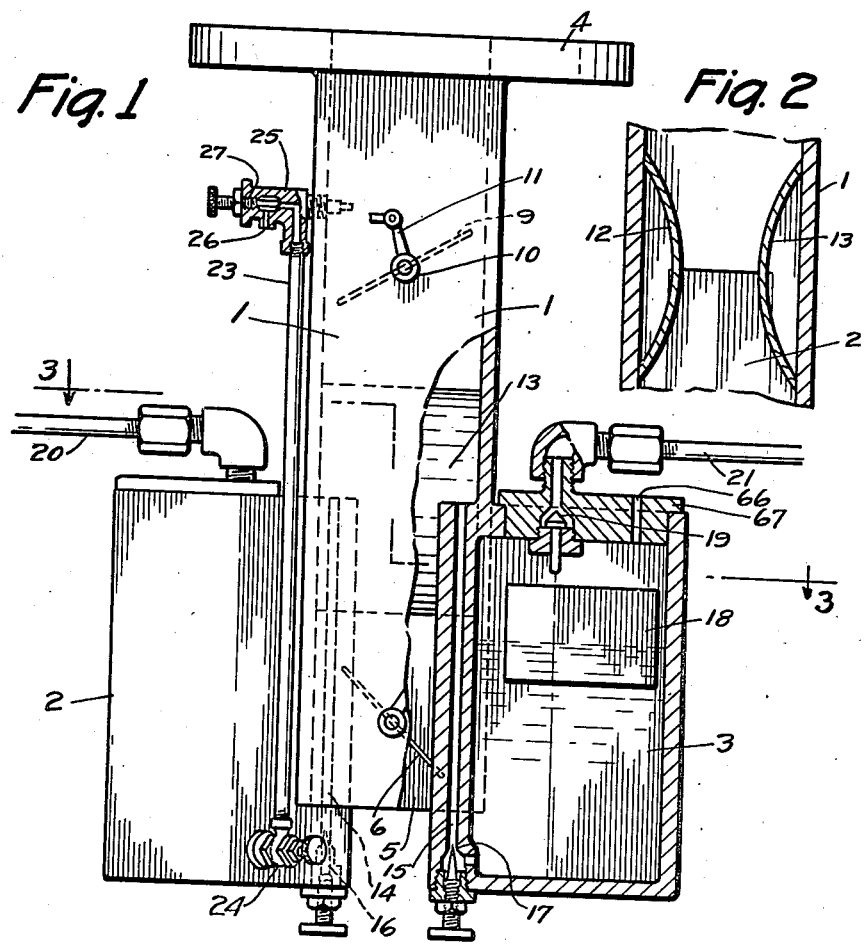
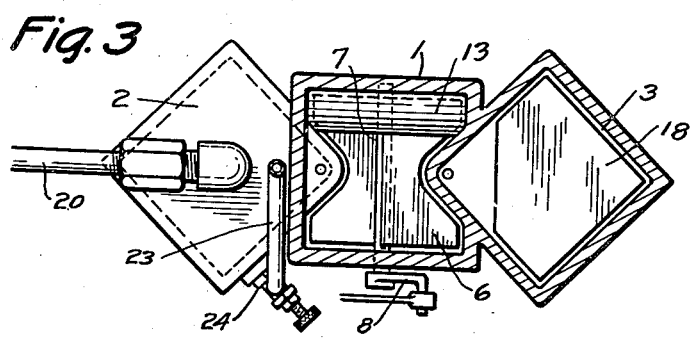
INVENTOR
Martin Winter
& Vito D'Amato
James Harrison Bowen
ATTORNEY Jan. 12, 1937. M. WINTER ET AL 2,067,221
CARBURETOR
Filed June 28, 1934 3 Sheets-Sheet 2
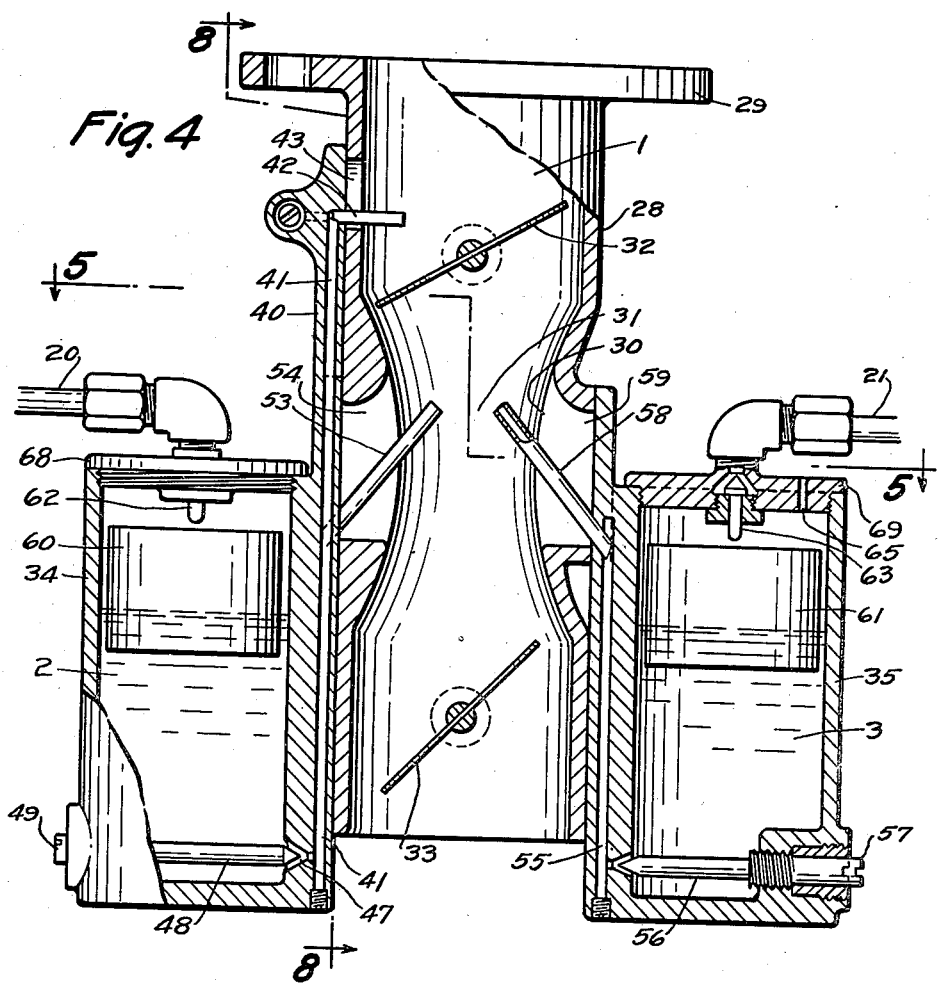
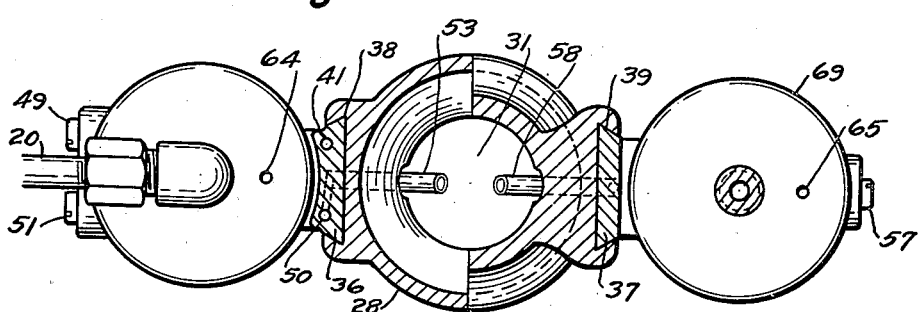
INVENTOR
Martin Winter
& Vito D'Amato
James Harrison Bowen
ATTORNEY

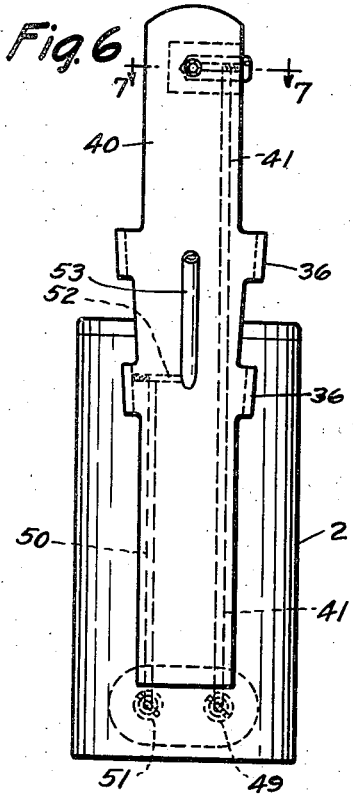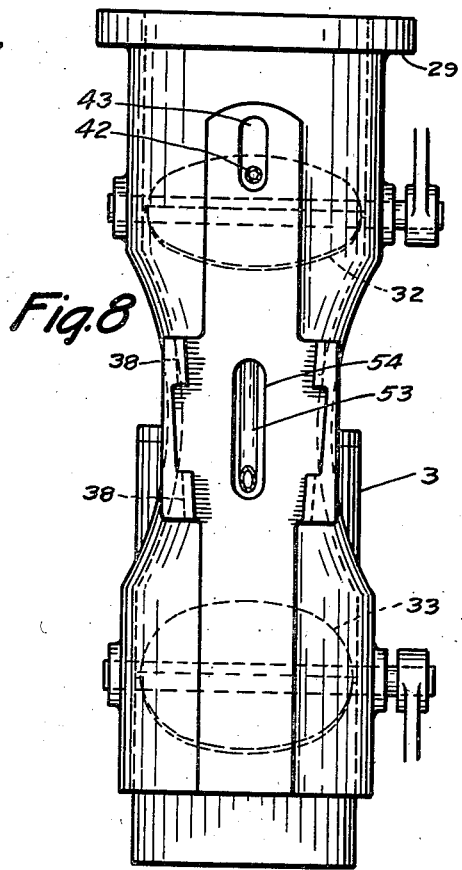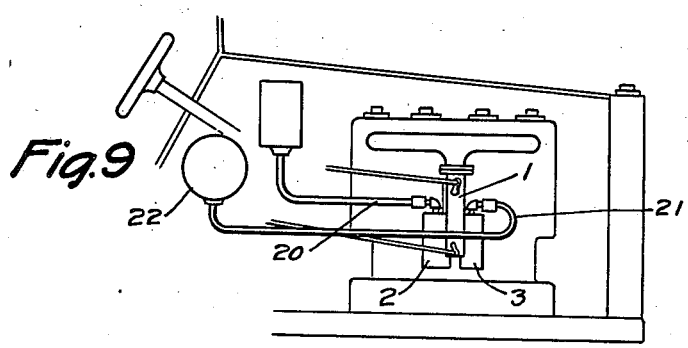

Patented Jan. 12, 1937

2,067,221

UNITED STATES PATENT OFFICE 2,067,221

CARBURETOR

Martin Winter, New York, and Vito D'Amato, Corona, N. Y.; said D'Amato assignor to said Winter Application June 28, 1934, Serial No. 732,752

5 Claims. (Cl. 261—18)

The purpose of this invention is to provide a method of mixing water with gasolene, or other fuel, for internal combustion engines to obtain a cool dense mixture, in order to reduce fuel consumption, provide a cooler running engine, and, at the same time, increase the efficiency of the engine.

The invention is a carburetor or fuelizer having a central mixing chamber with fuel and water chambers at the sides in which the fuel and water may be drawn into the central chamber at a point at which the area of the central chamber is reduced to increase the velocity of air passing therethru. The fuel and water chambers are also provided with float controlled valves and an auxiliary connection is also provided from the fuel chamber above said former connections thru which fuel may be supplied for low speeds and idling.

Many devices of this nature have been provided for using water with gasolene, or other fuels, in the form of steam or water vapor, and these devices have been connected to the carburetors and to different points in the intake manifolds, and these devices have produced different results in the burning of gasolene, or other fuels, in internal combustion engines; however, this apparatus goes a step further in introducing gasolene, or other fuel, and water simultaneously thru similar jets in an envelope of air at comparatively high velocity as the air enters the intake manifold, thereby conveying the fuel and water in atomized form into the intake manifold, so that it is drawn therefrom directly into the engine cylinders. An auxiliary jet is also provided for using fuel only for idling or low speeds.

One object of the invention is, therefore, to provide a mixing apparatus in which gasolene, or other fuel, and water may be intimately mixed as they are simultaneously drawn into the intake manifold of an internal combustion engine, and which is so constructed that the gasolene or fuel, only, may be drawn into the intake manifold, as may be desired.

Another object is to obtain a cool, dense mixture of fuel for internal combustion engines which provides a comparatively cool operating engine.

Other features and advantages of the invention will appear from the following description taken in connection with the drawings, wherein:

Figure 1 is a view showing a side elevation of the device with parts broken away showing the construction of the auxiliary chambers.

Figure 2 is a cross section thru the device showing the part of the tubular casing adjacent the inlet openings from the auxiliary chambers showing the baffles for reducing the area thereof.

Figure 3 is a cross section thru the chamber on line 3—3 of Figure 1, with the cover of one of the auxiliary chambers and also with one of the baffles shown in Figure 2 omitted.

Figure 4 is a view showing an alternate design in which the auxiliary chambers are provided as separate and independent members, and in which substantially all of the parts are shown in section.

Figure 5 is a cross section on line 5—5 of Figure 4.

Figure 6 is a view showing a side elevation of the reserve fuel chamber.

Figure 7 is a cross section on line 7—7 of Figure 6.

Figure 8 is a side elevation of the device with the reserve fuel chamber omitted, taken on line 8—8 of Figure 4.

Figure 9 is a diagrammatic view showing the general arrangement of the device as applied to an internal combustion engine.

In the drawings the device is shown as it may be made wherein numeral 1 indicates the central mixing chamber, numeral 2 the reserve fuel chamber, and numeral 3 the reserve water chamber.

The chamber 1 is preferably made in a tubular casing and this may be made square, as shown in Figures 1 and 3, or round, as shown in Figure 4, or of any shape. In the design shown in Figure 1, this casing is provided with a flange 4 at the upper end by which it may be connected to a carburetor flange of an intake manifold, and the lower end extends downward to a point 5 where it is open to the atmosphere. A butterfly valve 6 is provided in this casing adjacent the lower end, and this may be mounted upon a shaft 7 and connected by an arm 8 to any desired means on the instrument board or adjacent the steering wheel, by which it may be operated. A similar valve 9 may be provided adjacent the upper end of the casing, and this may be mounted upon a shaft 10, which may also be operated thru an arm 11 from a device on the instrument board, or adjacent the steering wheel. These valves 6 and 9 are preferably operated independently and any means may be used by which they may be connected to any convenient point. These valves are generally referred to as the throttle or choke valves, and the valve 9 is preferably connected to the gas or foot throttle, generally positioned on the floor of the vehicle. It will be understood, however, that any other type of valves may be used, and these may be located at any other points or operated by any other means.

Baffle plates 12 and 13 are shown in Figure 2, which may be positioned in the sides of the casing, as shown in Figures 1 and 3, to form a restricted area adjacent the upper ends of the reserve chambers 2 and 3. These plates may be welded in place, as shown, or made integral with the casting, or formed in any manner. The reserve chambers 2 and 3 are positioned as shown in Figure 3, and each is provided with a vertical opening, as indicated by the numerals 14 and 15, and the lower ends of these openings communicate with the lower ends of the chambers 2 and 3, and are provided with valves 16 and 17 by which the flow of fuel from the reserve chambers to the casing 1 may be controlled. These chambers are provided with floats 18 which control valves 19 adapted to be closed by the floats when fluid in the chambers rises above the predetermined level. The upper ends are connected thru the ends 19 to supply connections 20 and 21, the connection 20 extending to the vacuum tank and from there to the gasoline or fuel tank, and the connection 21 extending to a water supply tank 22, or any means for supplying water.

The fuel reserve chamber 2 is also provided with an auxiliary connection 23 which extends from a valve 24 in the lower end thereof to a valve 25 adjacent the upper part of the casing 1, and positioned at a point above the valve 9. The valve 24 may be set to regulate the amount of fuel entering the chamber 1 and this connection may be provided with an air inlet connection 26 having a valve 27 therein to admit air at this point with the valve adapted to be set to regulate the amount of air passing into the connection. It will be understood that this connection and also the valve therein may be incorporated in the casing 1, as shown in Figure 4, or may be arranged in any other manner. It will also be understood that the relative sizes and positions of the members 1, 2 and 3 may be changed and the regulating means may be adjusted in order to provide any desired comparative amounts of air, fuel and water, as may be desired.

In the design shown in Figures 4 to 8, the device is made with a central casing 28 having a flange 29 at the upper end, similar to the flange 4, and with the lower end open. The inner surface may be curved inward, as shown at the point 30, to provide a contracted area at the point 31, substantially in the center of the casing, and throttle valves 32 and 33 are positioned above and below the point 31, which may be connected to operating means of the engine, similar to the valves 6 and 9. In this design the reserve chambers 2 and 3 are formed of separate and independent casings 34 and 35, and these are provided with dove tailed flanges 36 and 37, which may be held in grooves 38 and 39 at the sides of the casing 28. It will be noted that these casings may be moved upward and removed from the casing 28, and may be replaced by holding the flanges 36 and 37 above the grooves 38 and 39, and then moving them downward into position.

The casing 34 is provided with an extension 40 having a passage 41 extending therethru from the lower end of the casing 34 and having a nipple 42 extending from the upper end of the passage 41 thru an opening 43 and into the casing 28 above the valve 32. The upper end of this extension may be formed as shown in Figures 6 and 7 with an air inlet connection 44 having a screw 45 therein by which the amount of air admitted to the nipple 42 may be regulated. A screw 46 may also be provided for controlling the amount of fuel passing thru the nipple 42 at this point. It will be understood, however, that any other means may be used for controlling the amount of air or the fuel at this point. The lower end of the passage 41 is connected to the interior of the casing 34 thru an opening 47 which may be regulated by a valve 48 thru a screw 49 on the exterior of the casing. This casing is also provided with a passage 50, which communicates with the lower end of the casing 38 and is provided with a valve similar to the valve 48, which may be operated by a screw 51, similar to the screw 49. It will be understood, however, that these valves may be operated in any other manner. The passage 50 extends across the casing at a point 52, and is provided with a nipple 53, which extends into the casing 28 adjacent the point 31 thru an opening 54, and it will be understood that fuel may be drawn thru the passage 50 across the connection 52, thru the nipple 53 into the interior of the casing 28. The reserve chamber 3 formed in the casing 35 is also provided with a similar connection, extending thru a passage 55 having a valve 56 in the lower end thereof adapted to be regulated by a screw 57 and also having a nipple 58 in the upper end, similar to the nipple 53 and extending thru an opening 59. This connection admits water from the chamber 3 to the point 31 in the contracted area of the casing 28.

The casings 34 and 35 are provided with floats 60 and 61, and as these are carried upward by liquids in the respective chambers, they will close valves 62 and 63 in the upper ends of the chambers, thereby restricting the flow of fuel to the connection 20 and also the flow of water to the connection 21, similar to the valves 19, shown in Figure 1. The upper ends of the casings may be provided with vents 64 and 65, as shown in Figure 4, and it will be noted that similar vents, as indicated by the numeral 66, will be provided in covers 67 of the design shown in Figure 1. It will also be noted that the openings 43, 54 and 59 are slotted to permit the nipples to move upward when removing the casings 34 and 35 from the sides of the casing 28. These slots, however, are covered by portions of the casings, as shown.

It will be understood that the reserve chambers 2 and 3 may be provided with threaded covers 68 and 69, as shown in Figure 4, or these covers may slide into place, as shown in Figure 1, or may be held by any means. It will also be understood that any other means may be used for attaching or holding the chambers 2 and 3 to the chamber 1, and the relative positions of these chambers may be changed, as may be desired.

It will be understood that other changes may be made in the construction of the device without departing from the spirit of the invention. One of which changes may be in the use of other means for restricting the flow of air thru the main casing to increase the velocity thereof, another may be in the location of the contracted area in relation to the reserve chambers 2 and 3, another may be in the use of other means for regulating the amount of the different fluids drawn into the central chamber, and still another may be in the use of other means for regulating the amount of air passing thru the central chamber.

It will be seen from the foregoing that, when valve 9 is open and the choke 6 is suitably adjusted, air drawn into the motor thru the carburetor travels at increased velocity thru the throat of the Venturi and picks up from the jets 14 and 15 fuel and water, respectively, which, mixed with the air passes on to the motor as an explosive mixture. During this operation, however, the jet at the top is inoperative, or substantially so. When, however, throttle valve 9 is closed, and the passage of air thru the throat of the Venturi tube is substantially lessened, or actually prevented, then, due to the increased suction to which the upper jet is subjected, fuel will be drawn up thru channel 23 to said nozzle and a quantity of air will enter the vent 26 to mix with said fuel, the quantity of air depending upon the adjustment of the valve 27.

An important purpose of this arrangement is to insure the spraying of the fuel and water directly and simultaneously into the air that is being drawn by the motor thru the air passage, and at a point where the velocity of the air has been increased by the Venturi tube action. As shown, the main fuel jet and the water jet enter the air passage at a point between butterfly valves 6 and 9. The secondary jet, however, is located between the butterfly valve 9 and the outlet end of the air passage. This auxiliary jet is commonly known as a low speed jet and its function is to supply fuel to the motor when the throttle valve 9 is closed, or substantially so, to afford low speed operation of the motor, as in idling.

It will be understood that in adjusting the carburetor for efficient operation, needle valve 17 will be carefully adjusted to provide the desired quantity of water which is to be permitted to flow thru the jet 15 and in a like manner, needle valves 16 and 24, which control the flow of fuel to jets 14 and 23, respectively, will also be carefully adjusted to govern the quantity of fuel to be delivered by each of said jets.

This device, in its preferred form, is an inexpensive unit which may readily be substituted for the usual carburetor of an internal explosion motor. The device, when applied to a motor and operated in accordance with the method herein described, affords, among other advantages, a marked increase in thermal efficiency, a high operating economy, and improved combustion. The invention makes possible the presence in the fuel air mixture of a relatively large quantity of a thermal diluent, water for example, in such form and in such relation, proportionately to the primary combustion supporting agents, as to compose an admixture which, when burned under pressure in a cylinder, is found to be more nearly ideal for the purpose. Another important feature of the invention is the method whereby said thermal diluent, in the form mentioned, is caused to be present as an intimate part of the said combustible mixture. In the operation of the ordinary internal combustion engine, a hydrocarbon fuel, gasolene for example, is employed, and an explosive mixture of fuel and air is delivered by induction, or otherwise, to the motor cylinder and therein compressed and exploded in a well known manner. In gas engine practice, a decided improvement has been shown to result from water injected into the cylinder, the water being injected as a fine spray in part of the air supply during induction, so as to avoid the formation of a film upon the cylinder walls. A thermal efficiency of 37% has been obtained by this means. It is possible that the real benefit accrues from the internal cooling, which is obtained at the expense of the latent heat of the water, the formation of steam bringing about the result. It is also believed that reduced radiation results during combustion and expansion, due to the presence of the steam formed. It has been found that the thermal efficiency of an engine is increased with rich mixtures, whereas with weak mixtures it is actually reduced. The explanation of these results is that the cylinder temperatures are much higher with the rich mixtures, and the heat losses to the walls and exhaust are consequently higher, whereas, with the weaker mixtures, the water injected would reduce the mean wall temperature below that corresponding with the maximum efficiency. It has been found that when employing water vapor in connection with the fuel air mixture higher compression pressures may be employed without fuel detonation. There is a corresponding increase in thermal efficiency and less tendency toward pre-ignition. This invention, therefore, utilizes water or water vapor in conjunction with the fuel air mixture in such a manner as to increase the operating efficiency of the motor and to improve combustion, thereby eliminating troublesome carbon formation within the cylinders.

Using water at atmospheric temperature and combining this with the fuel, provides a cool, dense mixture which keeps the engine comparatively cool while operating, thereby making it possible to maintain a cool intake manifold, the temperature of which is so low that a hand may be placed upon it at any time while the engine is running. It is preferred to use a mixture of about one-third water and two-thirds gasolene, however, it will be understood that these proportions may be varied for different conditions, or as may be desired. The water and gasolene are brought into the central chamber of the carburetor simultaneously and substantially at the same elevation. It will be understood, however, that the elevation of either jet may be changed in relation to the other and these jets may also be adjustable so that either one may be raised or lowered, as may be desired.

It will also be understood that, whereas gasolene and water have been specified as the products used, any other fuel may be used, and any other fluid may be used instead of water, or any composition of fluids may be used which is adapted to be combined with fuel to accomplish the same results.

Having thus fully described the invention, what we claim as new and desire to secure by Letters Patent, is:

1. A carburetor comprising a central body having an air passage therethru, bosses on each side of said body having tapered dove-tailed slots therein, a fuel supply unit and a water supply unit, each provided with a tapered dove-tailed tongue adapted to be engaged by the dove-tailed slots on said body, so as to form a complete carburetor assembly, the fuel unit and the water unit each having means for injecting fuel and water, respectively, into said air passage, said means comprising a jet carried by each of said units and adapted to project into the said air passage when the said units are in place on the said central body.

2. A fuelizer as described in claim 5 in which said jets extend out of the corners of said water and fuel tanks extending into said chamber.

3. A device as described in claim 5 in which the vertically positioned chamber is provided with baffles extending inward from the sides thereof forming a restricted area, and in which water and fuel supply tanks are removably mounted at the sides thereof with parts thereof extending into said vertically positioned chamber.

4. A device as described in claim 5 in which the said water and fuel tanks are provided with removable covers.

5. A fuelizer comprising a vertically positioned chamber having closing means adjacent each end thereof, and independent jets projecting into said chamber from opposite sides thereof between said closing means and opening toward one end thereof, one of said jets directly connecting with a fuel supply tank and the other with a water supply tank, said fuel and water supply tanks positioned at opposite sides of said chamber; characterized in that the vertically positioned chamber comprises a square tube and in which the water and fuel tanks which are also square are removably mounted at the sides of said vertically positioned chamber with corners thereof projecting into said chamber.

MARTIN WINTER.
VITO D'AMATO.